April 30, 1963  T. H. GEWECKE ETAL  3,087,491
PARENTERAL SOLUTION EQUIPMENT AND METHOD OF MAKING
Filed March 14, 1958  4 Sheets-Sheet 1
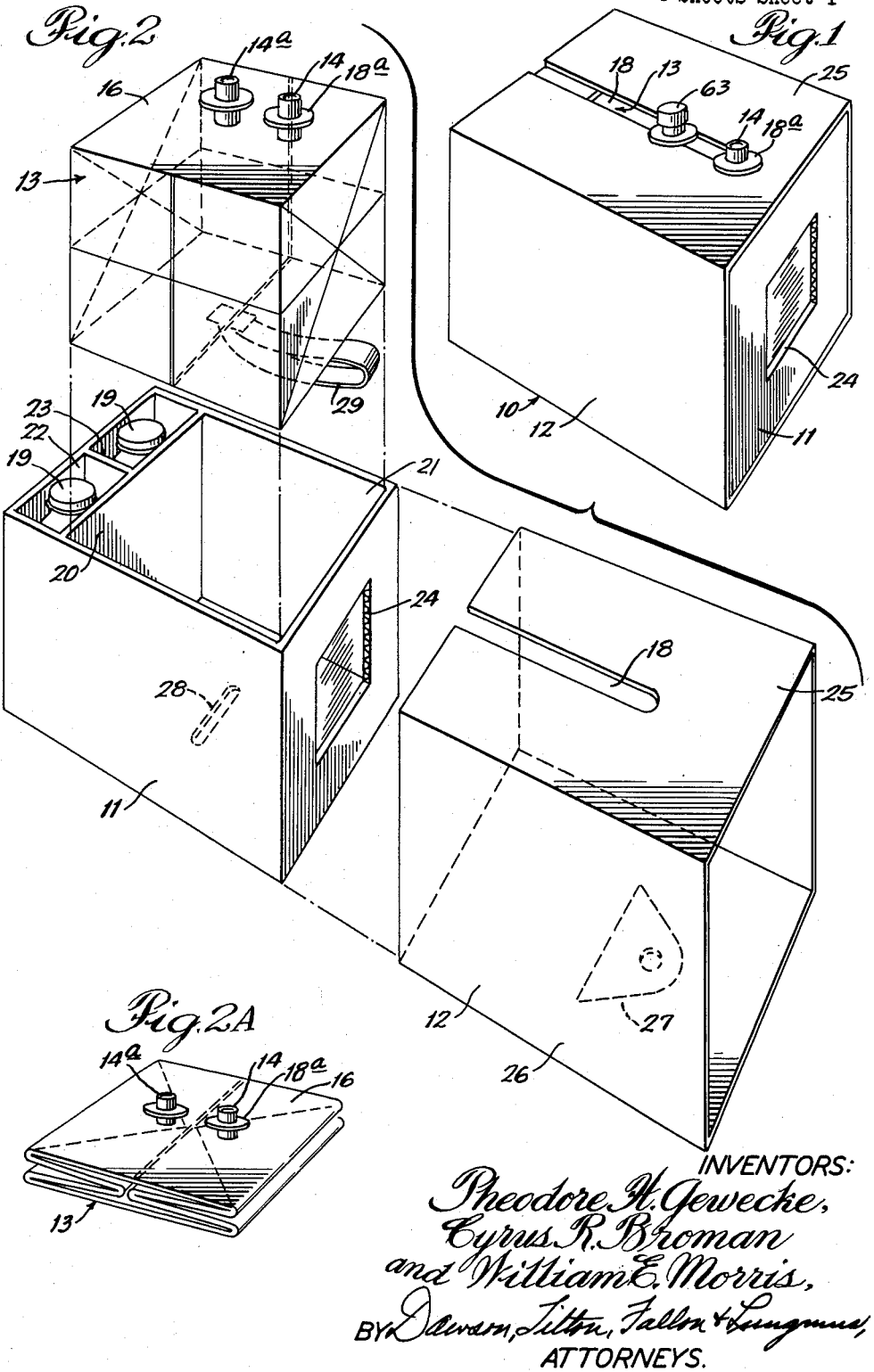

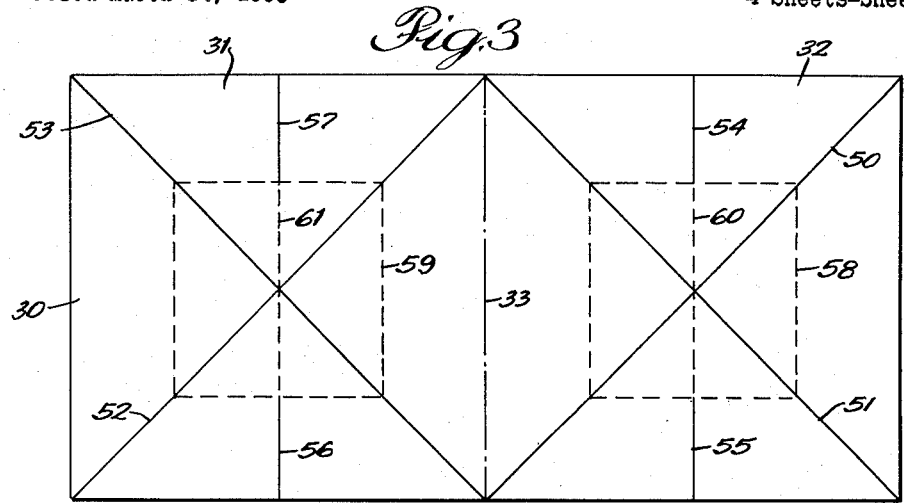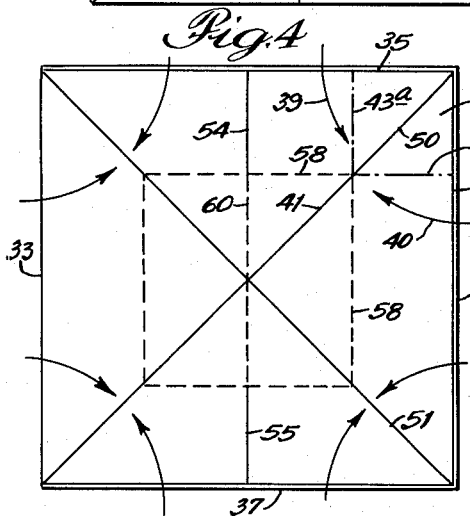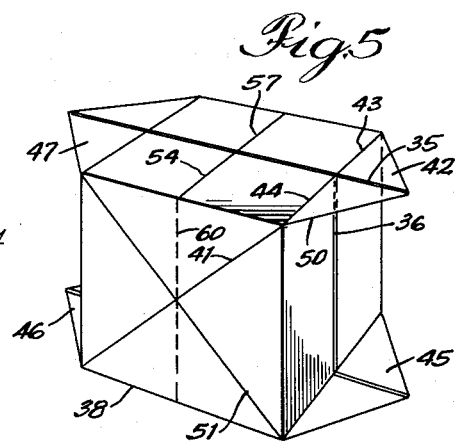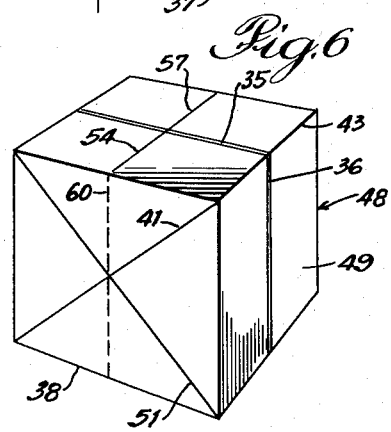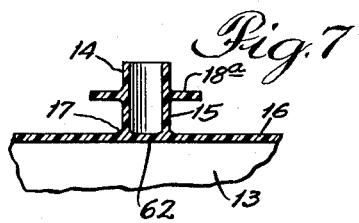

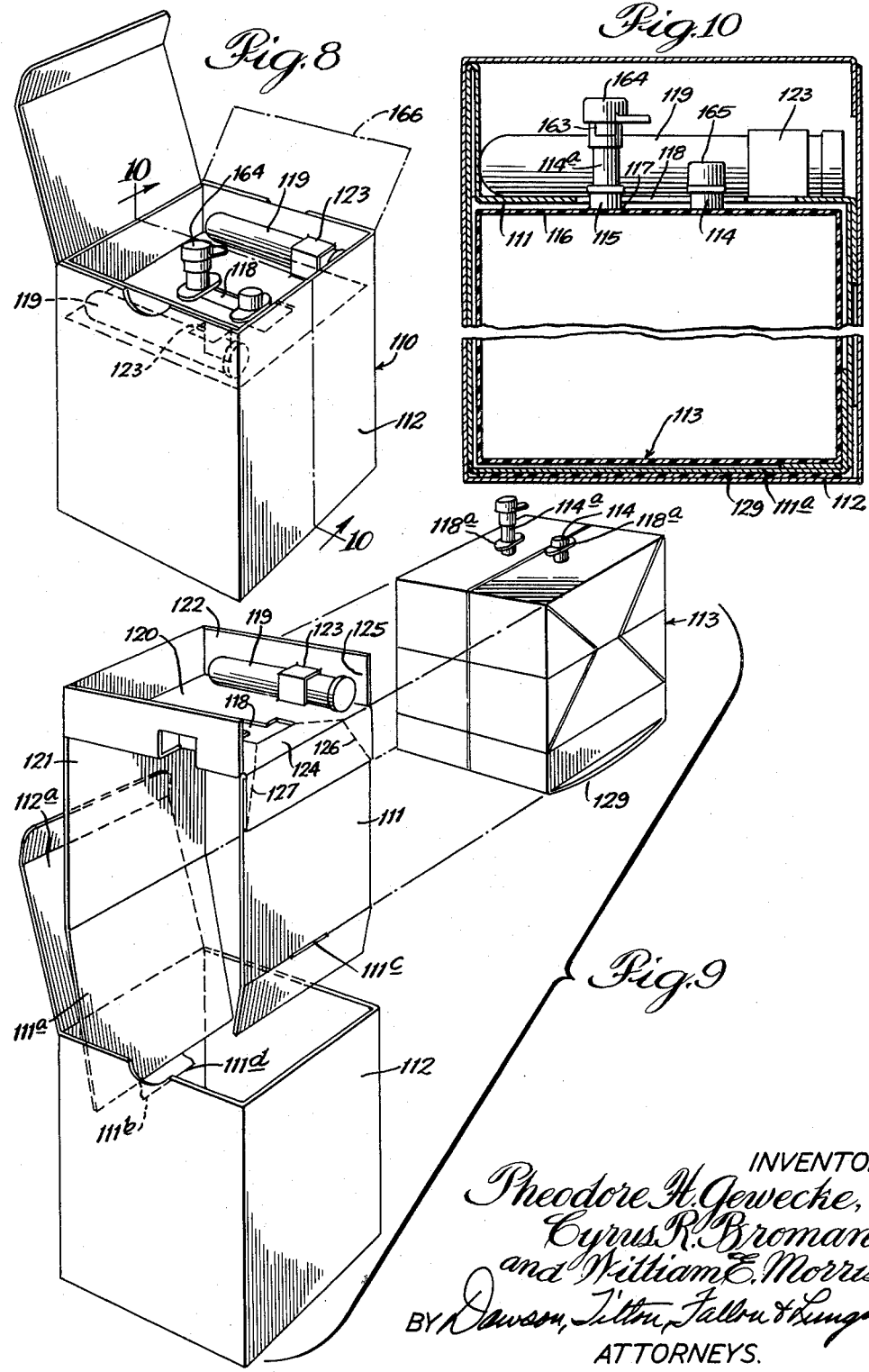

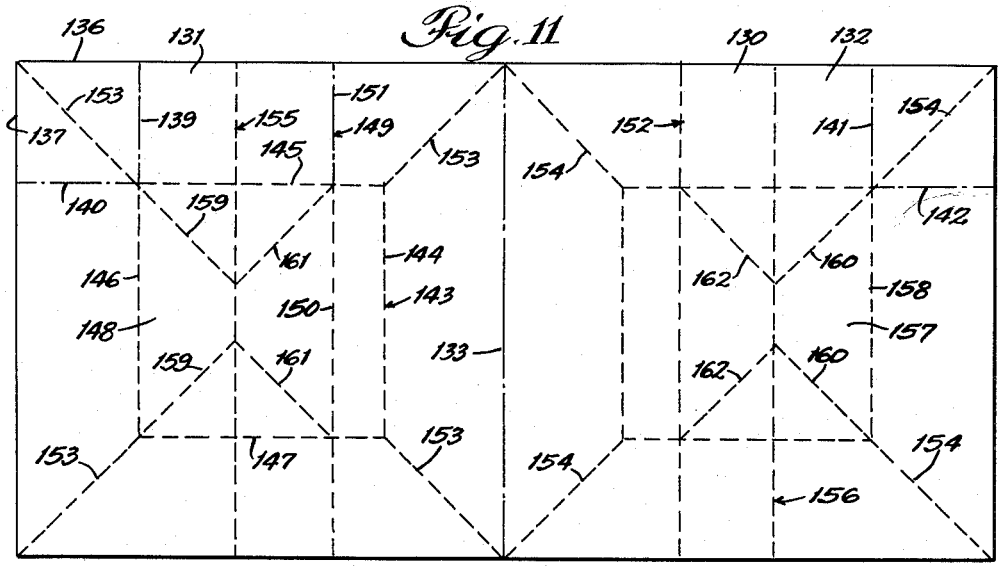
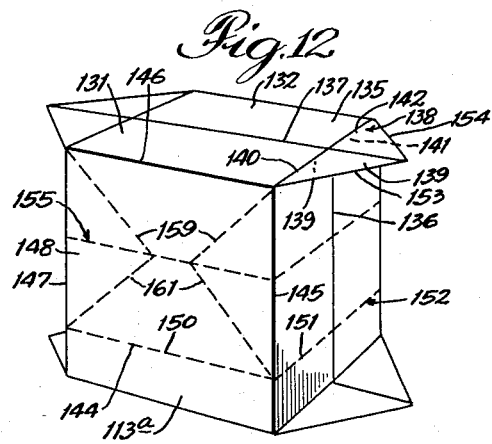
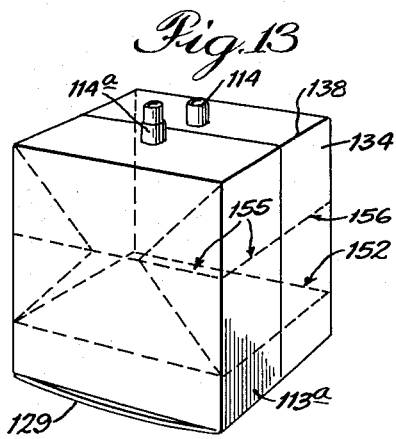
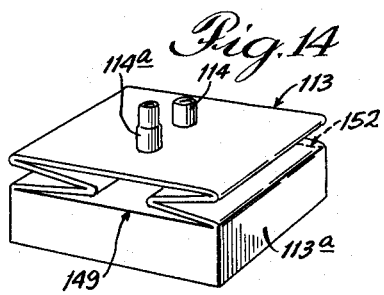
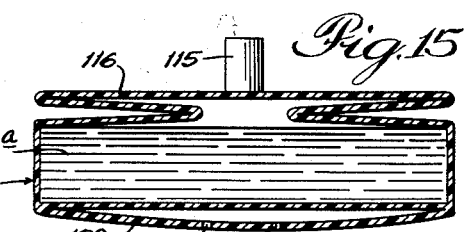

United States Patent Office 3,087,491
Patented Apr. 30, 1963

3,087,491
PARENTERAL SOLUTION EQUIPMENT AND
METHOD OF MAKING
Theodore H. Gewecke, Glenview, Cyrus R. Broman, Evanston, and William E. Morris, Northbrook, Ill., assignors to Baxter Laboratories, Inc., Morton Grove, Ill., a corporation of Delaware
Filed Mar. 14, 1958, Ser. No. 721,450
10 Claims. (Cl. 128—272)

This invention relates to parenteral solution equipment and the method of making the same, and, more particularly, to a container for parenteral solutions.

Heretofore, parenteral solutions such as saline, glucose, blood plasma, etc., have been provided in two types of containers. The type first employed is the well known glass bottle which is provided with a constricted neck portion closed by an appropriate stopper. This type of container is further characterized by the provision of a band about the bottom portion of the bottle which supports a bail used to suspend the bottle in a mouth-downward condition for dispensing the parenteral liquid from the bottle.

The second type of container for parenteral solutions makes use of a collapsible plastic bag equipped with a suitable outlet fitting along one side and an inlet fitting, where necessary. The plastic bag, as presently known, generally has a rectangular configuration and, when filled with a parenteral fluid, assumes the shape of a pillow. The principal advantage attributed to plastic bags as parenteral solution containers over the previously long-used bottles was that of resistance to breakage. The flexible plastic bag could be subjected to shocks not tolerable by glass bottles, and thus their desirability in times of national emergency especially recommended them.

However, a number of problems arise in the use of the hitherto known plastic bags. Some of these problems are newly created by the plastic bag itself, while others are common to both the bag and the glass bottle.

A major problem facing the users of plastic bags is in their storage. It is to be appreciated that most parenteral fluids have to be stored so as to be ready for use. In the case of nutritional solutions, the time of storage may well run into months and even years. In the case of blood, although the storage life is much shorter, generally being limited to about three weeks, the problem is even more pressing, since blood must be stored under refrigeration. A flexible plastic bag, even when filled to capacity, presents a storage problem since it is essentially a limp mass. For filled plastic bags to be stored conveniently, special racks are generally required. In the case of a refrigerator, this means considerable lost space.

Another problem facing the users of plastic bags is that of filling the bags with a predetermined volume of fluid. This problem is particularly acute when the parenteral fluid is blood. Heretofore, filling with a predetermined amount of fluid has been achieved by weighing the bags during the filling operation. In a production line, this is possible, although cumbersome. In a blood collection center like a blood bank, it becomes even more difficult. It is to be appreciated with the plastic bags previously used that the internal volume can vary over wide ranges dependent upon the degree of dilation of the bag so that weighing is the only satisfactory method of making sure that a predetermined volume of fluid has been introduced into the plastic bag.

Other problems particularly characteristic of the use of plastic bags relate to the difficulty of labelling them and their disadvantage of permitting the evaporation of liquid. The latter problem is especially vexatious in plastic bags that are employed for the collection and storage of blood. Although the bags, after use as a blood collection container, are stored for only a short time so that the evaporation of liquid through the bag wall is minimal, often they are stored for many months prior to use in collecting blood. During this period, the liquid anticoagulant solution often evaporates to such an extent that the bag is useless as a blood collection container.

Other problems which might be considered mutual to both glass bottles and plastic bags include the possibility of breakage. Although the plastic bag is specifically considered superior to the glass bottle in this respect, it is to be appreciated that a bag filled with a liquid could readily rupture if dropped onto a hard surface, although perhaps not as readily as a glass bottle. To avoid this possibility, it has been considered necessary to go to quite thick walls for the plastic bags, and even this does not eliminate this difficulty. In the case of both glass bottles and bags used for collecting blood, there is a problem of associating pilot tubes or serology sample containers. It is considered mandatory that two small test tubes be associated with each container earmarked for blood collection purposes. Each of these tubes is filled at the time of the blood transfusion with the contents of one tube shortly thereafter being analyzed for identification of the blood. The second tube is retained with the container until just prior to administration of the blood to an intended recipient or the preparation of plasma, when its contents are analyzed as to type, Rh factor, etc., to cross-match the blood against the blood of the intended recipient, as well as to give a check on the original analysis. Since the administration of the wrong type of blood could be fatal, it is considered mandatory to provide this double check. In the past, special racks, cartons, identations, and the like, have been used in connection with both bags and bottles in order to provide means for continuously associating the pilot tubes with the major blood collection container.

It is an object of this invention to provide a means for overcoming the problems and disadvantages outlined above. Another object is to provide a new parenteral solution container and the method of making it. Still another object is to provide a parenteral solution container in the form of a regular geometric figure such as a rectangular solid and which includes an inner, flexible envelope and an outer substantially rigid carton. Yet another object is to provide a novel method of making the flexible envelope whereby it is adapted to be collapsed to a substantially lay-flat condition when unfilled. Other objects and advantages of this invention can be seen as this specification proceeds.

This invention will be explained in conjunction with the accompanying drawings, in which:

FIGURE 1 is a perspective view of a parenteral solution container constructed in accordance with the teachings of this invention;

FIGURE 2 is a view similar to FIG. 1 but showing the various parts thereof in exploded relation;

FIGURE 2A is a perspective view of the flexible envelope shown in FIG. 2 but in a collapsed condition;

FIGURES 3-6 show various steps of making the flexible envelope shown at the extreme top left-hand portion of FIG. 2 and also in different condition in FIG. 2A;

FIGURE 7 is an enlarged, cross-sectional view of the top wall of the above-mentioned envelope and showing an integral flow fitting attached to that wall;

FIGURE 8 is a view similar to FIG. 1 but showing a modified form of the invention;

FIGURE 9 is a view similar to FIG. 2, i.e., showing an embodiment of the invention in exploded relation, but of the embodiment pictured in FIG. 8;

FIGURE 10 is an enlarged cross-sectional view taken along the line 10—10 of FIG. 8;

FIGURE 11 is a view similar to FIG. 3 but of the embodiment pictured in FIGS. 8–10;

FIGURES 12 and 13 show various stages in the manufacture of the flexible envelope developed from the blank pictured in FIG. 11;

FIGURE 14 is a view similar to FIG. 2A but of the modified form of the invention shown in FIGS. 8–13; and FIGURE 15 is an enlarged cross-sectional view taken along along the line 15—15 of FIG. 14.

Referring now to the drawing, and, in particular, to FIGS. 1 and 2, the numeral 10 designates generally a parenteral solution container constructed in accordance with the teachings of this invention. The container 10, as best seen in FIG. 2, includes three main elements: a rigid container 11, a cover 12 therefor, and an inner flexible translucent envelope 13.

In the illustration given, it is to be noted that container 10 and its component parts 11–13 all assume the shape of rectangular solids in so far as their outlines are concerned. Specifically, envelope 13 is a cube. However, it is to be appreciated that other regular geometric figures can be employed. By such, we mean a figure which has a planar base and side walls extending upwardly from the periphery of the base, the walls being united at the top thereof to provide a discrete third dimension for the figure. For example, this could include cylinders, cones, and prisms.

As mentioned above, envelope 13 is shown as a cubical figure and is preferably constructed of a translucent, thermoplastic, resinous material. A novel method of manufacturing envelope 13 will be set forth hereinafter with respect to FIGS. 3–6. Essentially, however, envelope 13 is a hollow cubical block which is adapted to collapse on itself along various fold lines in the side faces thereof to the structure shown in FIG. 2A. The top wall of envelope 13 is equipped with at least one flow fitting 14 and, in the illustration given, two such fittings are shown, the second fitting being designated by the numeral 14a. Two fittings are provided when the container is intended to collect and store blood, one fitting being employed for the collection and the other fitting for the dispensing of blood. In the case of an envelope used for a parenteral solution other than blood, fitting 14a can be eliminated.

Where envelope 13 is constructed of a thermoplastic resinous material, the structure shown in FIG. 7 can be employed to provide fitting 14 integral with envelope 13. In FIG. 7, it is seen that fitting 14 includes a tubular element 15 which is outstanding from the top face 16 of envelope 13. Connection between tubular element 15 and top face 16 can be achieved by heat-sealing, as at 17, so that a portion of the top wall 16 serves as a puncturable barrier to fluid attempting to exit from envelope 13 through tubular element 15. The same structure can be employed with respect to fitting 14a. Fitting 14, which also could be termed a nipple, is equipped with an integral annular flange 18a, seen only in FIGS. 1, 2 and 7, which is spaced outwardly from the top wall 16 of envelope 13 and which cooperates with a slot 18 in cover 12 to maintain nipples 14 and 14a in an outwardly-oriented condition such as is pictured in FIG. 1.

Referring now to FIG. 2, carton 11 is seen to include a generally rectangular container having an open top. Carton 11 is somewhat longer than it is wide by a distance sufficient to accommodate pilot tubes 19, two of which are seen in FIG. 2. A transverse interior wall 20 is provided in carton 11 which separates the interior into two portions, one of which receives pilot tube 19 and the other of which defines a cubical chamber 21 adapted to receive envelope 13. The remaining chamber in carton 11 defined by interior wall 20 and designated 22, is in turn divided into two chambers by a second interior wall 23, wall 23 extending in a longitudinal direction and providing two equally sized compartments for pilot tubes 19. The end wall of carton 11 opposite the chamber 22 is provided with a window 24. In the construction given, carton 11 is constructed of a corrugated cellulosic material such as paper, and window 24 is provided by cutting an opening into the end wall of carton 11 and overlaying the opening with a transparent plastic film.

As seen in FIG. 1, cover 12 is slidingly received over carton 11 to provide a closed container. Inasmuch as the height and width of carton 11 have the same dimension, it is possible for cover 12 to be received on carton 11 in any one of four ways. During periods of nonuse, such as during shipment or storage, cover 12 is received on carton 11 in an orientation 90° from that shown in FIGS. 1 and 2 so that a wholly-enclosed side of cover 12 overlies the open top of carton 11. During use of envelope 13, as for the collection or dispensing of blood, cover 12 can either be completely removed or oriented to the position shown in FIGS. 1 and 2, whereby the fittings or nipples 14 and 14a are received in slit 18 and supported by the wall 25 in which slit 18 is made, against the depression of nipples 14 and 14a that would be occasioned by inserting a puncturing object or connecting needle of a parenteral fluid set (not shown).

The face of cover 12 opposite face 25 (the bottom face in FIG. 2) and which is designated by the numeral 26, is provided with a hinged flap 27. Hinged flap 27, slot 28 in the bottom wall of carton 11, and strap 29 secured to the bottom of envelope 13 all cooperate to provide suitable hanging means for container 10 during the administration of a fluid therefrom which, as pointed out above, is generally achieved by positioning a parenteral solution container in a mouth-downward position so as to take advantage of gravity flow. Strap 29 can be conveniently heat-sealed to the bottom face of envelope 13 and, when not used for suspending container 10, can be inserted through slot 28 and be positioned in a flat position against the bottom wall of carton 11. In this position, when cover 12 is received on carton 11, strap 29 is frictionally held between the bottom wall of carton 11 and the bottom wall 26 of cover 12 to prevent inadvertent removal of envelope 13 from chamber 21 when nipples 14 and 14a are lifted upwardly to an elevation such that they can be received within slot 18.

The mode of preparation of envelope 13 will now be described, and, for that purpose, reference to FIGS. 3–6 is made. In FIG. 3, the numeral 30 designates a flat sheet of thermoplastic resinous material having a rectangular configuration, with the width being one-half the length. Envelope 13 can be formed from sheet 30 by bringing the two halves 31 and 32 into face-to-face relation by folding sheet 30 along its center line 33 shown in chain line in FIG. 3. Thereafter, the adjacent un-united edges of halves 31 and 32 are peripherally united as by heat-sealing to form a flat envelope. The lay-flat envelope so achieved is the essential structure employed in the plastic parenteral solution containers heretofore known. Such a structure is designated generally by the numeral 34, and is shown in FIG. 4 with the folded edge 33 occurring at the left side and the remaining three sides united by heat-seals 35, 36 and 37. To form an envelope 38 of the configuration shown in FIG. 5 which is the precursor of the envelope 13 shown in FIGS. 1 and 2, we thereafter manipulate the envelope 34 so as to bring the sides adjacent each corner into superimposed relation. For example, in FIG. 4, heat-seals 35 and 36 can be brought into superimposed relation by pressing the sides together in directions designated by the arrows 39 and 40, respectively. This results in folding envelope 34 along a diagonal line such as is designated by the numeral 41. The change in structure effected by this manipulation can be appreciated from a consideration of FIG. 5, in which the upper right-hand corner is provided with numerals designating elements corresponding to the upper right-hand corner of FIG. 4. In FIG. 5, it is seen that the edge defined by heat-seal 35 is superimposed on the edge defined by heat-seal 36 to provide a triangular flat portion 42. Thereafter, we heat-seal triangular portion 42 along a line 43 which is perpendicular to the superimposed heat-seals 35 and 36, and, in the illustration given, is located one-quarter of the length of heat-sealed edge 35 away from the corner provided by the intersection of edges 35 and 36. The triangular portion 42, as further defined by 43, would, in the two-dimensional view of the precursor envelope shown in FIG. 4, be a square designated 42a and having sides 35, 36, 43a and 44a, where 44a would correspond to a line 44 in FIG. 5 almost co-linear with line 43 (assuming line 43 intersects edge 35 and line 44 intersects edge 36). Severing of triangular portion 42 removes, in effect, square-shaped portion 42a from the envelope 34 shown in FIG. 4, but with edges 43a and 44a united.

Thereafter, the same operation is provided at the remaining three corners of envelope 34, as indicated in FIG. 5 and designated by the numerals 45, 46 and 47 referring to the lower right-hand corner, the lower left-hand corner, and the upper left-hand corners, respectively. Severing of the triangular portions associated with each corner results in the structure shown in FIG. 6 and designated generally by the numeral 48. The cubical envelope designated 48 is provided with numerals similar to those in the foregoing figures. For example, the top surface of envelope 48 consists of two portions joined together by heat-seal 35. The right side face includes heat-seal 36. This side face, which is designated by the numeral 49, in the preferred embodiment of our invention, becomes the bottom of envelop 13 and the face to which strap 29 is secured. The face directly opposite is a face not containing a heat-sealed seam such as 35, 36 or 37, containing instead fold 33, and is employed as the top face of envelope 13 which is designated by the numeral 16 in FIG. 2. The absence of the heat-sealed seam permits the location of conduits or fittings 14 and 14a in any position on face 16 without regard to having to avoid a heat-sealed seam. These nipples can be installed on face 16 in the manner hereinbefore described in connection with FIG. 7.

We have found it particularly desirable to provide envelope 13 in the form that it is readily collapsible to approximately a lay-flat condition such as is shown in FIG. 2A. The procedure employed for this purpose can also be appreciated from a consideration of FIGS. 3–6. To provide an envelope 13 that readily collapses to the compact structure shown in FIG. 2A, we perform two creasing steps prior to the folding of sheet 30 along the center line 33. The creasing steps are illustrated in FIG. 3 by means of solid and dotted lines. Referring now to FIG. 3, sheet 30 is provided on one face thereof with eight line creases or scorings which are shown in solid line. Four of these weakenings or creasings that permit preferential folding occur along diagonal lines and are designated by the numerals 50, 51, 52 and 53, the numerals being applied at the corners of sheet 30 for quick recognition. The same side of the sheet 30 is also creased for preferential or directionalized folding along bisectors or median lines of each half 31 and 32, the lines of creasing being designated by the numerals 54, 55, 56 and 57. It is to be appreciated that the eight crease lines just described can be provided by a single die and in a single operation. The reverse face of sheet 30 is also provided with eight lines of scoring, the lines being grouped into two groups of four each, with each group defining a square positioned centrally of each half 31 and 32 and having sides one-half the sides of halves 31 and 32. The creasing lines just referred to can be immediately recognized in FIG. 3 and are designated by the numerals 58 and 59.

Two additional line creases are provided in the reverse face, these creases bisecting squares 58 and 59 and connecting previously-formed creases 54 and 55, and 56 and 57, respectively. These additional line creases are designated in FIG. 3 by the numerals 60 and 61.

When the structure of FIG. 3 is thus provided and thereafter folded along line 33 as by bringing half 31 underneath half 32, the structure of FIG. 4 is presented, except for the provision of the peripheral heat-seals 35–37 shown in FIG. 4. When the folding operation has been performed half 32 will be uppermost, as can be appreciated from the nomenclature ascribed to the crease lines shown in FIG. 4. There, it is to be noted that the diagonal crease line 50 corresponds to the diagonal line 41.

The structure pictured in FIG. 6 (to which the numerals appearing in FIGS. 3–5 have been applied) can then be collapsed to the form shown in FIG. 2A by moving face 49 toward its oposite face. This operation causes the envelope to preferentially collapse along the fold lines previously introduced and designated by the numerals 50–61. It is considered desirable to provide envelope 13 in a form capable of collapsing to a substantially lay-flat condition, since this permits easier assembly of the parts prior to use and, in use, provides better drainage of the liquid contents.

To fill envelope 13, a portion of wall 16 circumscribed by one of the flow conduits or fittings 14 or 14a is removed, such as is designated by the numeral 62 in FIG. 7. In case envelope 13 is used as a container for a parenteral solution other than blood, fitting 14 may thereafter be provided with an integral diaphragm (not shown), so as to seal the interior contents against contamination. Alternatively, a removable cap of the nature shown in FIG. 1 and designated by the numeral 63 may be provided the flow conduit. In the instance that envelope 13 is to be used for the collection and storage of blood, two flow conduits 14 and 14a are provided, as described above. One of these is "cored," so as to remove portion 62, and the envelope is partially charged with a liquid anticoagulant. Thereafter, cap 63 is applied to the fitting circumscribing the cored portion 62, the cap 63 preferably being constructed of rubber or some analogous material that is capable of resealing itself after puncture by a hypodermic needle.

After the filling operation has been completed as outlined above, or, alternatively, prior to the filling operation, envelope 13 can be inserted into chamber 21 of carton 11. Thereafter, cover 12 is applied to carton 11 in such a manner as to position slot 18 adjacent one of the side faces of carton 11 and thereby insure an entirely closed box around envelope 13. Prior to the application of cover 12 to carton 11, carton 11 can be equipped with pilot tubes 19 which may take many forms, all of which are well known to the art. In the instance where envelope 13 is employed to contain a parenteral solution other than an anticoagulant for blood, the pilot tubes 19 can be dispensed with and carton 11 can be provided in a cubical, rather than a rectangular, solid configuration.

After cover 12 has been received on carton 11, the assembly can be covered with a film of moisture-impervious material such as a metal foil. Alternatively, it is possible to construct carton 11 and cover 12 of a substantially moisture-impervious material such as polystyrene and sealing the mating edges of carton 11 and box 12 to prevent escape of moisture vapor from envelope 13 through these open edges. The sealing of the edges or overlay of the carton with a film provides the additional function of giving immediate notice to a user whether the assembly has been previously opened or otherwise tampered with. Thus, it is possible to use a cap 63 to close the open conduit through which the solution or anticoagulant is introduced into envelope 13. Alternatively, it is possible to press-fit within the fitting circumscribing cored portion 62 a plug of rubber or other similar resilient material.

The use of the assembly provided according to the procedure outlined above has been partially described hereinbefore. A somewhat more detailed description follows herewith and is articulated in terms of a container employed to collect blood. It is to be appreciated, however, that the same procedure can be employed for containers used for parenteral solutions other than blood, since the administration steps for blood and other parenteral solutions are essentially the same.

When container 10 is desired to be used for the collection of blood, first the seal or outer moisture-impervious film is broken or otherwise removed, permitting the slidable removal of cover 12 from carton 11. Cover 12 is then rotated ninety degrees so as to bring the side containing slot 18 into planar relation with the open top of carton 11. Cover 12 is then positioned over carton 11 with fittings 14 and 14a extending through slot 18 with the flange portions 18a thereof overlying the top face of cover 12. Thereafter, a blood collection set needle is inserted into fitting 14a through cap 63. Since such collection sets have tubing of a considerable length, it is possible to position container 10 (now in the form pictured in FIG. 1) a substantial distance below the body of the donor, so as to achieve a rapid transfer of blood through gravity. The course of the collection can be viewed through window 24, and the transfusion continues uninterruptedly and without the need for weighing or otherwise assessing the quantity withdrawn until envelope 13 is filled. When envelope 13 is filled, further receipt of the donor's blood is automatically terminated. Even though the attendant should not notice the end of the collection by a matter of a few minutes, only the predetermined amount of blood will have been collected, usually 400 to 500 cc. It is possible for the attendant nurse or physician to immediately ascertain whether the envelope 13 is completely filled by merely glancing through slot 18. Inasmuch as envelope 13 is confined within the rigid cubical container or box defined by carton 11 and cover 12, there is no possibility of overcollection of blood.

When the collection is finished, the blood from the blood collection set or additional blood from the donor can be introduced into the pilot tubes 19. Preferably, one of the pilot tubes 19 is unremovably mounted within carton 11 so as to remain therewith until the blood collected is ultimately administered. Cover 12 can be conveniently provided with a printed face carrying a description of the contents, along with spaces for the entry of blood type, Rh factor, etc., all of which is determined shortly before from blood donor samples; or after collection from an analysis of the contents of one of the pilot tubes 19. Additional spaces may be conveniently provided for the entry of similar information from analysis of the second pilot tube which is performed shortly before administration to the recipient.

After the collection has been completed, cover 12 is once again removed from carton 11, rotated 90°, and reapplied in its original assembled position. Thus, a rectangular-shaped container is provided which is readily storable in stable stacks within a refrigerator of a hospital, blood bank, shipping container, etc.

When it is desired to administer the blood so collected, or, for that matter, a parenteral solution housed in a similar container, cover 12 can be removed, rotated 90° again so as to bring slot 18 and its associated face over the open top of carton 11. This provides a bearing surface for flange 17 so as to permit the application of pressure on the puncture hub or bottle connector of a parenteral administration set. Thereafter, the container 10 is inverted and suspended by strap 29 from a standard, and the administration commences. Alternatively, it is possible to remove envelope 13 from carton 11 and suspend this element of container 10 alone.

If desired, it is possible to equip either or both fittings 14 and 14a, as the case may be, with parenteral tubing sets. Sometimes it is considered desirable to provide a blood collection set integral with the storage container. This can be readily done. So also can a parenteral administration set be similarly provided.

In FIGS. 8–15 of the drawings, a modified embodiment of this invention is shown. The numeral 110 designates generally a parenteral solution container which, as in the previously described embodiment of this invention, comprises three portions, as can be better appreciated from the exploded view seen in FIG. 9. Container 110 includes a rigid inner receptacle 111, a rigid outer receptacle 112, and a flexible, translucent envelope 113. Envelope 113 is essentially similar to envelope 13 shown in connection with the embodiment of this invention as pictured in FIGS. 1–7, with the exception that the envelope is provided with slightly modified creases which produce a collapsed envelope of the form shown in FIG. 14. From a comparison of FIGS. 14 and 2A, it is noted that in this embodiment envelope 113, when collapsed, still retains a rectangular solid configuration produced by a discrete vertical dimension which is mutually perpendicular to the two dimensions in the base of the envelope. This vertical dimension produces a smaller rectangular solid (designated in FIG. 14 by the numeral 113a) which has an internal volume equal to the amount of anticoagulant solution employed when the envelope is used as a blood collection container. Blood is ordinarily collected in amounts of approximately 400 to 500 ml. A container for 500 ml. of blood (the half liter size) requires about 75 to 120 ml. of an anticoagulant solution defined in the U.S. Pharmacopoeia, so that the standard volume of a half liter blood collection unit is about 575 to 620 ml. The rectangular solid or chamber 113a, therefore, when the envelope 113 is intended for the collection of a half liter of blood, has an internal volume of about 120 ml. Specifically, a cubical container would have sides about 3¼″ and a chamber 113a having a height of about ⅝″.

Envelope 113 is provided with a pair of flow fittings 114 and 114a, each of which includes a tubular element 115 which is upstanding from the top face 116 of envelope 13 (best seen in FIGS. 10 and 15). Fittings 115 can be conveniently connected to top face 116 by heat-sealing, as at 117. Each of fittings 114 and 114a is equipped with a laterally-extending flange 118a which is spaced outwardly from the top wall 116 and which cooperates with a slot 118 in inner receptacle 111 to maintain the fittings or nipples 114 and 114a in the outwardly oriented condition pictured in FIG. 8.

As best seen in FIG. 9, inner receptacle 111 is seen to be of a generally rectangular configuration with open sides. As seen in FIG. 9, the bottom wall 111a of inner receptacle 111 is equipped with a tongue 111b that is introduceable into slot 111c in the opposite side wall of receptacle 111 to that with which bottom wall 111a is hingedly connected. The bottom wall 111a is inserted between the bottom wall of envelope 113 and a supporting band 129 on envelope 113, and is thereafter formed into the rectangular configuration by locking tongue 111b in slot 111c. Thus, envelope 113 is quickly and conveniently inserted into inner receptacle 111 and is thereafter confined within inner receptacle 111 in a tamper-proof condition. By providing tongue 111b with laterally-extending portions 111d, the tongue is locked in position in slot 111c in such a manner that it cannot be removed without damaging the laterally-extending portions 111d and thereby giving a visual indication that the envelope 113 has been tampered with. This is considered important, since the pilot tubes 119 are associated with inner receptacle 111 and are needed for grouping, typing and cross-matching purposes up to the time blood is dispensed from envelope 113.

For the purpose of providing a chamber for the receipt of pilot tubes 119, the inner receptacle 111 is made somewhat greater in one dimension than in the remaining two dimensions. As seen in FIGS. 8 and 9, the top wall 120 of inner receptacle 111 provides, with the side walls, a pair of chambers 121 and 122, chamber 121 being essentially cubical and adapted to receive envelope 113. Struck from the opposite side walls and the top wall 120 of inner receptacle 111, which walls serve to define chamber 122, are corner-like tabs 123 in which pilot tubes 119 are received. Inasmuch as one pilot tube is intended to be used just prior to the administration of blood from envelope 113, it is substantially unremovably locked within its associated tube 123 as by an adhesive, or the like, applied to the interior wall surfaces of tab 123. In this connection, it is to be noted that chamber 122 is defined by only three upstanding walls, with the fourth wall missing to provide ready access to the stoppered ends of pilot tubes 119.

To remove envelope 113 from inner receptacle 111, it is only necessary to grasp the portion 124 of top wall 120 which defines the end of slot 118 adjacent to the open side 125 of chamber 122. A pulling action on portion 124 causes rupture of inner receptacle 111 along weakened lines 126 and 127 (seen only in FIG. 9), after which envelope 113 can be removed laterally from inner receptacle 111. Thereafter, it is possibly to suspend envelope 113 in a mouth-downward condition either by element 129, or by a smaller loop within element 129 provided by centrally disposed, parallel slits 128, as seen in FIG. 15.

Outer receptacle 112 has a configuration generally approximating that of inner receptacle 111 in that it has a height somewhat greater than its other two dimensions. The top portion of outer receptacle 112 may be closed by a hinged cover 112a after envelope 113 and inner receptacle 111 have been positioned therein. As before, the assembled container 110 can be protected against moisture vapor loss by an overlay of a moisture-impermeable film such as metal foil, or the like. It is also possible to construct outer receptacle 112 of a material that is substantially impervious to the passage of moisture vapor therethrough and provide seals along the edges of the top cover 112a.

The method of construction of envelope 113 is essentially similar to that described hereinbefore with respect to the envelope 13 shown in conjunction with FIGS. 1–7. The blank or flat sheet 130 from which envelope 113 is constructed is shown in FIG. 11 and preferably has a width one-half the length. By folding sheet 130 along its center line 133 shown in chain line, two halves 131 and 132 are provided which define equal faces of the to-be-constructed envelope 113. After the sheet 130 is folded as indicated, the adjacent un-united edges of halves 131 and 132 are perimetrically united as by heat-sealing to form a flat envelope.

The procedure by which the cubical configuration in FIG. 13 is formed from the blank 130 of FIG. 11 by passing through the intermediate structure 135 of FIG. 12, is identical to that described hereinbefore in conjunction with FIGS. 3–6. Essentially, that procedure includes the steps of bringing faces 131 and 132 into face-to-face relation by folding sheet 130 along fold line 133; thereafter peripherally sealing the faces 131 and 132 together to form a lay-flat envelope which is square in plan; manipulating the lay-flat envelope so achieved so as to bring adjacent corner-defining edges such as 136 and 137 into superimposed relation; and thereafter uniting the adjacent faces so provided along a line transverse to the superimposed corner-defining edges 136 and 137. The line along which the adjacent faces are united is designated by the numeral 138 in FIG. 12 and corresponds to the lines 139 and 140 shown in chain line at the upper left-hand corner of FIG. 11. Thus, the union along line 138 unites portions of base 131 to itself and portions 132 to itself, since the line 138 also includes lines 141 and 142 shown in the upper right-hand corner of FIG. 11. The tab 139 occurring at the upper right-hand corner of the cube shown in FIG. 12 is isolated from the remainder of the cube by the union along one line 138 and thereafter can be detached. The same procedure is performed sequentially at each of the other three corners to provide the configuration 134 shown in FIG. 13. If desired, fittings 114 and 114a can be joined to the envelope 113 before sheet 130 is edge united.

To achieve a rectangular solid configuration which has a noncollapsible bottom portion such as represented by the numeral 113a in FIGS. 12–15, sheet 130 can be pre-scored or creased along the dotted line shown in FIG. 11. It is to be appreciated that the creasing can be done with a single die in a single operation, but for ease of understanding, the crease lines will be described individually and correlated between FIGS. 11 and 12.

Face 131 is provided with a centrally disposed square crease 143 which, in area, is exactly one-quarter the area of face 131 and which is defined by the connected crease lines 144, 145, 146, and 147. These connected crease lines cooperate to provide face 148 which is the front face of the configuration shown in FIG. 12. Face 131 is provided with a transversely-extending crease line generally designated by the numeral 149 which intersects square crease 143 through lines 145 and 147 at points adjacent line 144. The portion of line 149 between lines 145 and 147 is designated by the numeral 150 applied both to FIGS. 11 and 12. The portion of line 149 external of the face 148 and defined by line 145, is designated by the numeral 151, also applied to both figures.

The transverse line 152 which corresponds to transverse line 149 is provided in face 132, and this is seen also in both FIGS. 12 and 13. Lines 149 and 152 in the completed unit designated 113 in FIG. 14 serve to define the upper limit of chamber 113a.

Each of faces 131 and 132 is provided with four diagonal segments, designated by the numerals 153 and 154, respectively, that connect the corners of each face with its centrally disposed square crease. These crease lines aid in forming the corner tabs 139 and eventually disappear from the completed container, as can be appreciated from a comparison of FIGS. 12 and 13. Each face 131 and 132 of sheet 130 is provided with additional creasing lines that permit the development of the folded or collapsed structure seen in FIG. 14. A second transverse line is provided each face 131 and 132, the transverse line being designated generally by the numeral 155 in face 131 and by the numeral 156 in face 132. These lines bisect the portion of the squares 148 in face 131 and 157 in face 132, remaining, lying between lines 150 and 146 in square 148, and lying between lines 152 and 158 in square 157. Face 131 is additionally creased within square 148 by continuing diagonal crease lines 153 inwardly to a point of intersection with line 155, as designated by the numeral 159. Similar creases are provided in square 157 of face 132 and designated by the numeral 160. Additional diagonal lines are provided within each of squares 148 and 157 by connecting the inner ends of lines 159 and 160, respectively, with lines 149 and 142, also respectively, where these latter lines intersect the sides of the two squares. The last-mentioned connecting lines are designated by the numeral 161 in face 131 and 162 in face 132.

The use of the embodiment of this invention pictured in FIGS. 8–15 is essentially similar to that hereinbefore described with respect to FIGS. 1–7. Where the envelope 113 is to be employed as a blood collection and storage container, both fittings 114 and 114a are provided. The portion of top wall 116 of envelope 113 which is circumscribed by fitting 114a is removed to permit filling of envelope 113 with anticoagulant solution. Thereafter, a rubber plug 163 is introduced into fitting 114a and the unsecured end of fitting 114a is covered by a removable dustcap 164. When blood is to be introduced into container 113, dustcap 164 is removed and the bottle puncture needle of a blood collection set is introduced through plug 163 into communication with the interior of envelope 113. When the collection is completed, the needle can be removed from plug 163, the plug thereafter resealing because of its resilient nature. A similar dustcap is provided on the unsecured end of fitting 114 and is designated by the numeral 165. When blood is to be dispensed or portions aspirated in the form of plasma from envelope 113, dustcap 165 is removed, exposing sterile surface, and the bottle puncture cannula of a blood administration set is inserted into fitting 114 and through top wall 116, rupturing the same and establishing communication between the set and the interior of envelope 113.

It is possible to equip the outer receptacle 112 with inwardly-foldable side flaps such as is designated by the numeral 166 and applied to a flap shown in dotted line. In addition to providing extra protection for the contents of outer receptacle 112, these flaps also serve as indicators to indicate when the envelope 113 is filled, thus eliminating the need for a window. The flaps are pivoted upwardly and inwardly when pressure is exerted against the side walls to which they are attached, this pressure being exerted only when envelope 113 is filled. So now, a blood collection can be performed without having a nurse in constant attendance to disconnect the collection set from the donor the exact minute a bottle or bag is filled to a prescribed level. When envelope 113 is filled, no additional blood can be introduced because of the resisting nature of the rigid containers about the envelope. Further, the position of flaps 166 gives an immediate visual signal of when the collection is complete.

In the event that envelope 113 is to be used for a parenteral solution other than blood, fitting 114 can be dispensed with and only fitting 114a need be employed. It is to be noted that the location of the fitting 114a, spaced from the central portion of the top face 116, permits the molded-in portions of square 148 to be brought in underneath fitting 114a so as to provide a temporary seal prior to the time fitting 114a is equipped with plug 163. This would be the case during filling of envelope 113 with anticoagulant solution or where plug 163 is omitted, as where envelope 113 was used for housing a parenteral solution other than blood.

While, in the foregoing specification, we have set forth a detailed description of an embodiment of this invention, it will be apparent to those skilled in the art that numerous changes may be made in those details without departing from the spirit and principles of the invention.

We claim:

1. In a parenteral solution storage container, a flexible bag-like container having the shape of a rectangular solid when liquid-filled, liquid outlet connection means associated with one of the faces of said solid, and a rigid container having a hollow interior configuration of a rectangular solid and enclosing said flexible container, said rigid container having an extra chamber therein, and a blood pilot tube mounted in said extra chamber.

2. The structure of claim 1, in which said extra chamber is provided by providing one dimension of said outer container longer than necessary to accommodate the equivalent dimension of said flexible bag-like container.

3. The structure of claim 1, in which the said pilot tube is removably mounted in said chamber and a second pilot tube is substantially unremovably mounted in said chamber.

4. In a blood collection unit, a flexible translucent envelope defined by a planar face and a plurality of side walls extending upwardly from the periphery of the base thereof, said side walls being united at the top thereof to provide a discrete third dimension for said envelope, said side walls being collapsible when said container is empty of liquid, and a rigid-walled receptacle about said envelope and effective to limit increase of the internal volume of said envelope, said envelope containing an anti-coagulant solution, the anti-coagulant solution being present in an amount less than that effective to fully expand said envelope, said envelope, when substantially fully expanded, having generally the shape of a rectangular solid.

5. In a blood collection unit, an envelope constructed of flexible, translucent plastic material, said envelope comprising generally rectangular spaced-apart base and top walls, four generally rectangular side walls connecting said top and base walls, said envelope when liquid-filled being supportable on said base wall while assuming the rectangular solid configuration necessarily resulting from the wall arrangement and without the need of lateral support, said envelope containing an anti-coagulant solution, the anti-coagulant solution being present in an amount less than that effective to fully expand said envelope and a rigid-walled receptacle about said envelope and effective to limit increase of the internal volume of said envelope, said envelope being equipped with blood collection and discharge means in said top wall.

6. In a blood collection unit, a generally box-shaped container having six walls, each constructed of a flexible translucent thermoplastic material, one of said walls being equipped with a hanger, and the wall opposite said one wall being equipped with a pair of liquid flow fittings, said container containing an anti-coagulant solution and being only partially expanded thereby, and a rigid container about the said box-shaped container, said rigid container being sized to confine said box-shaped container against expansion when said box-shaped container is being liquid-filled.

7. In a blood collection unit, a flexible bag-like container having the shape of a rectangular solid when substantially liquid-filled and unsupported, one face of said container having blood inlet and outlet means, a rigid receptacle about said container effective to limit the increase of the internal volume thereof, said container containing an anti-coagulant solution and being but partially expanded thereby, and a blood pilot tube secured to said unit.

8. The structure of claim 7 in which the face of said container opposite said one face is equipped with hanger means.

9. In a blood collection container, a non-rigid, translucent envelope having approximately a cubical shape when liquid-filled, blood collection and dispensing means in one of the faces of said envelope, a rigid outer container having a chamber adapted to snugly receive said envelope when said envelope is liquid-filled, said envelope being received in said chamber a liquid anti-coagulant partially filling said envelope, and a moisture vapor-impervious cover for said outer container, said envelope being equipped, on the face thereof opposite the face having said collection and dispensing means, with a handle constructed of flexible plastic material, said handle being removably secured to the interior of said outer container.

10. In a blood collection container, a non-rigid, translucent envelope having approximately a cubical shape when liquid-filled, blood collection and dispensing means in one of the faces of said envelope, a relatively rigid outer container positioned about said envelope, the inner chamber of said container being sized to snugly receive said envelope when it is liquid-filled, a liquid anti-coagulant partially filling said envelope, and a moisture vapor-impervious cover for said outer container positioned about said container.

References Cited in the file of this patent

UNITED STATES PATENTS 2,382,536    Baxter _____ Aug. 14, 1945

(Other references on following page)

UNITED STATES PATENTS

| | | |
|---|---|---|
| 2,481,380 | Anderson | Sept. 6, 1949 |
| 2,618,409 | Eisenberger et al. | Nov. 18, 1952 |
| 2,658,662 | Paulsen | Nov. 10, 1953 |
| 2,736,925 | Heisler et al. | Mar. 6, 1956 |
| 2,757,669 | Gewecke et al. | Aug. 7, 1956 |
| 2,780,225 | Barr et al. | Feb. 5, 1957 |
| 2,791,367 | Mefford | May 7, 1957 |
| 2,848,995 | Ryan | Aug. 26, 1958 |
| 2,816,718 | Winzen | Nov. 25, 1958 |
| 2,982,286 | Welch | May 2, 1961 |
| 3,017,883 | Dickinson | Jan. 23, 1962 |

FOREIGN PATENTS

| | | |
|---|---|---|
| 1,090,432 | France | Oct. 20, 1954 |
| 772,636 | Great Britain | Apr. 17, 1957 |

OTHER REFERENCES

Jones: "An Improved Pilot Tube," New England Journal of Medicine, vol. 255, No. 8, Aug. 23, 1956, pages 389–390 (available in scientific library).